(12) United States Patent
Zimmer et al.

(10) Patent No.: US 8,046,964 B2
(45) Date of Patent: Nov. 1, 2011

(54) COVER PLATE ANCHOR

(76) Inventors: Günther Zimmer, Rheinau (DE); Martin Zimmer, Rheinau (DE)

(*) Notice: Subject to any disclaimer, the term of this patent is extended or adjusted under 35 U.S.C. 154(b) by 213 days.

(21) Appl. No.: 12/386,570

(22) Filed: Apr. 20, 2009

(65) Prior Publication Data

US 2009/0272065 A1 Nov. 5, 2009

Related U.S. Application Data

(63) Continuation-in-part of application No. PCT/DE2007/001867, filed on Oct. 19, 2007.

(30) Foreign Application Priority Data

Oct. 19, 2006 (DE) .......................... 10 2006 049 953

(51) Int. Cl.
*F16B 13/04* (2006.01)
*E04B 1/38* (2006.01)

(52) U.S. Cl. ............. 52/364; 52/787.1; 411/32; 411/45; 411/57.1; 411/82.3

(58) Field of Classification Search .................... 52/364, 52/787.1; 411/32, 45–48, 57.1, 82.3
See application file for complete search history.

(56) References Cited

U.S. PATENT DOCUMENTS

| | | | | |
|---|---|---|---|---|
| 3,042,156 A * | 7/1962 | Rohe | .......................... | 52/787.12 |
| 3,651,563 A * | 3/1972 | Volkmann | ........................ | 29/523 |
| 4,428,705 A * | 1/1984 | Gelhard | ........................ | 411/82.1 |
| 4,514,125 A * | 4/1985 | Stol | ................................ | 411/82.3 |
| 5,261,772 A * | 11/1993 | Henninger et al. | ............. | 411/46 |
| 5,980,174 A * | 11/1999 | Gallagher et al. | ............... | 411/55 |
| 6,702,534 B2 * | 3/2004 | Filipp | ............................... | 411/58 |
| 7,413,367 B2 * | 8/2008 | Hawang | ........................ | 403/297 |
| 2009/0274533 A1 * | 11/2009 | Zimmer et al. | .................. | 411/49 |
| 2010/0115882 A1 * | 5/2010 | Seroiszka et al. | ............. | 52/787.1 |
| 2010/0175345 A1 * | 7/2010 | Zimmer et al. | .................. | 52/711 |
| 2010/0178130 A1 * | 7/2010 | Zimmer et al. | ............... | 411/80.2 |
| 2010/0280535 A1 * | 11/2010 | Yamaguchi et al. | ........... | 606/167 |
| 2010/0287874 A1 * | 11/2010 | Zimmer et al. | .................. | 52/699 |
| 2010/0287875 A1 * | 11/2010 | Zimmer et al. | .................. | 52/699 |
| 2011/0027037 A1 * | 2/2011 | Zimmer et al. | ................. | 411/82 |

* cited by examiner

*Primary Examiner* — Robert Canfield
(74) *Attorney, Agent, or Firm* — Klaus J. Bach

(57) ABSTRACT

In an anchor for the attachment to construction panels including two cover plates and an intermediate support core layer wherein the anchor comprises an expansion body and a wedge body which inserted into the expansion body and includes an opening for screwing or pounding in a mounting means, the installed anchor is disposed in an opening of the panel which extends through the first cover plate and the intermediate support core plate. The expansion body has locking zones and engagement elements which are spreadable by wedge elements. With the anchor installed, a wedging zone spreads out the engagement elements of the expansion body behind the cover plate and the locking zones are interlocked.

10 Claims, 7 Drawing Sheets

COVER PLATE ANCHOR

This is a continuation-in part application of pending international patent application PCT/DE2007/001867 filed Oct. 19, 2007 and claiming the priority of German patent application 10 2006 049 953.0 filed Oct. 19, 2006

BACKGROUND OF THE INVENTION

The invention resides in an anchor for mounting in a planar building component having first and second cover plates with an intermediate support plate, wherein the anchor includes at least a spreading body and at least one wedge body and wherein the wedge body, which is at least partially inserted into the spreading body, includes a cavity for threading or punching a mounting member into the anchor.

Flat construction components are often designated as sandwich plates, honeycomb plates or light weight construction plates. All plate types used in furniture construction comprise generally cover layers of thin particle boards, medium or high density fiber boards, plywood or hard fiber boards. The sandwich plates often have an intermediate support structure comprising corrugated web inserts or so-called expanded honeycombs. Most lightweight construction plates have a raw density below 500 kg/m$^3$. If as intermediate layers no fire resistant foamed aluminum or foamed glass is used, the raw density is below 350 kg/m$^3$. For comparison, the raw density of a normal particle board is about 600 to 75 kg/m$^3$.

If fixtures are to be attached to light-weight plates for example, by screws, the problem arises that the attachment means find support only in the relatively thin cover layers or cover plates. Typical solutions in such cases are spreading anchors as they are disclosed in the printed publication DE 20 204 000 474 V1. The spreading anchors however have the disadvantage that they engage the upper plate in the front and the back side over a large area. The rear engagement additionally displaces the support core material over a large area around the bore, whereby the cover plate is more easily detached from the support core material and is lifted off if the anchor is subjected to high tension forces.

Another anchor which avoids this disadvantage is known from the internet catalog (September 2006) of the comparing Fischer Befestigungssysteme GmbH. It is listed there under the designation SLM-N. The anchor has a tubular spreading body, into whose bore an at least sectionally truncated cone-shaped wedge body is inserted at the rear slotted spreading body end. The wedge body has a central bore with an internal thread. If the wedge body is moved into the spreading body for example by tightening of a retaining screw which is disposed in the thread of the wedge body, the spreading body is spread and clamped, that is, engaged in the lower area of the bore. However, this anchor would require a very rigid core material to be firmly engaged therein.

It is the object of the present invention to provide an anchor for lightweight construction panels which is easy to install and which is safely and durably engaged in the light-weight construction panel.

SUMMARY OF THE INVENTION

In an anchor for the attachment to construction panels including two cover plates and an intermediate support core layer wherein the anchor comprises an expansion body and a wedge body which inserted into the expansion body and includes an opening for screwing or pounding in a mounting means, the installed anchor is disposed in an opening of the panel which extends through the first cover plate and the intermediate support core plate. The expansion body has locking zones and engagement elements which are spreadable by wedge elements. With the anchor installed, a wedging zone spreads out the engagement elements of the expansion body behind the cover plate and the locking zones are interlocked.

To this end, the installed anchor is disposed in an opening of the construction component which extends through the first cover plate and the intermediate support core layer. The spreading body has at least two expandable engagement elements and a locking zone. When the anchor is installed, a first cylindrical zone abuts in the bore the first cover plate, a wedging zone expands the engagement elements of the spreading body behind the first cover plate—abutting this cover plate, the locking zones are locked to one another and the end of the spreading body abuts the second cover plate.

Alternatively, the installed anchor is disposed in an opening of the component which extends through the first cover plate and the intermediate support layer. The spreading body includes at least two spreadable engagement elements, one locking zone and a chamber with a cement material cartridge which includes at least one cement material and which has discharge bores at both sides thereof. The wedging body has at least one cylinder zone, at least one wedge zone, at least one locking zone and a piston-like end. With the anchor installed, the cylinder zone is arranged in the bore adjacent the cover plate, a spreading zone spreads the engagement elements of the spreading body behind the first cover plate abutting the cover plate—the locking zones are interconnected, the bottom end of the spreading body abuts the second cover plate and the cement of the opened cement cartridge is spread out between the lower cover plate and the bottom end of the spreading body.

With the present invention, an anchor for light-weight building plates is provided which has a high retaining force and can be rapidly installed manually as well as by a machine.

The invention will become more readily apparent from the following description of schematically shown embodiments.

BRIEF DESCRIPTION OF THE DRAWINGS

It is shown in.

DESCRIPTION OF PARTICULAR EMBODIMENTS

Figure 1:
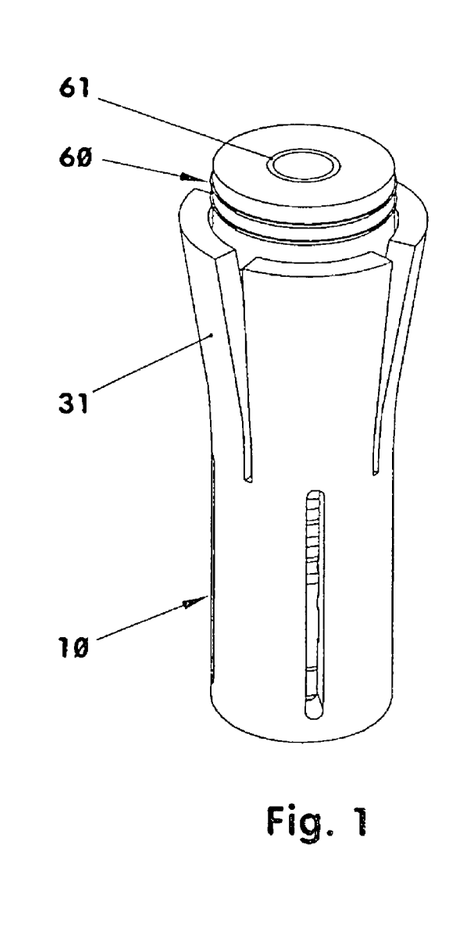
FIG. 1: A perspective representation of an expansion anchor.

FIG. 1 shows an expansion anchor in the form which it would have after installation in a lightweight construction panel. In this embodiment, the anchor has only two parts, an expansion body (10) and a wedge body (60). Both parts (10, 60) are shown separately in FIGS. 2 and 3. The anchor according to FIG. 1 has for example a length of 35 mm. The opening drilled for mounting the anchor has for example a diameter of 8.5 mm. The diameter of the unexpanded anchor is in this design either maximally three times the core diameter of the screw to be installed via the anchor in the light-weight building plate or, maximally 2.3 times the actual diameter of the screw when threaded into the anchor.

Figure 4:
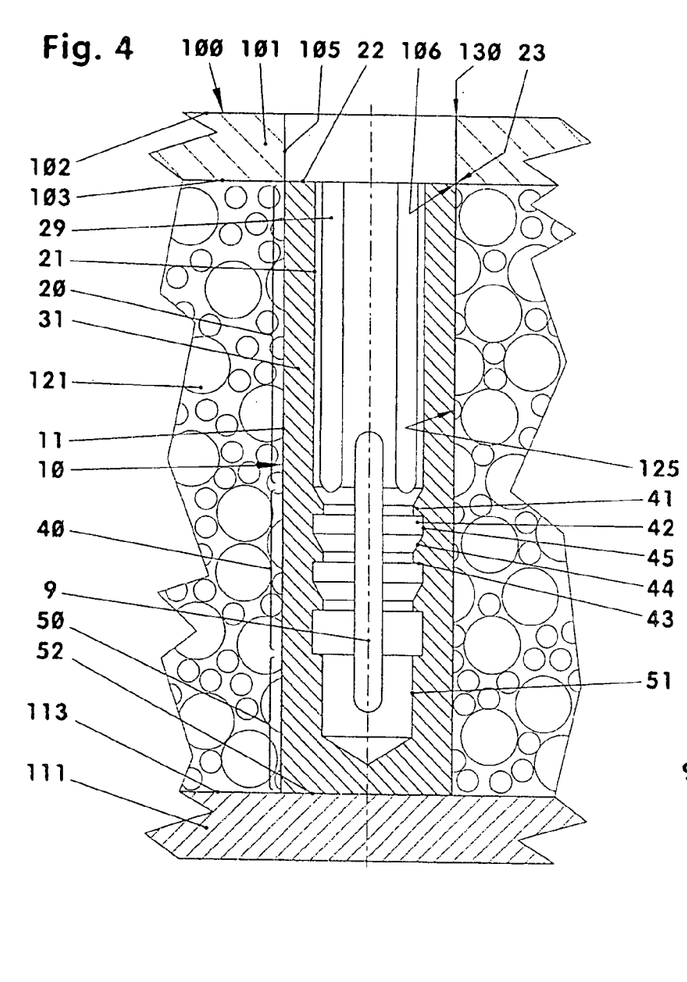
FIG. 4: An expansion body inserted into a light-weight building panel.

The anchor is provided for example for the mounting of fixtures to light-weight building panels (100) without walers and solid inserts, see FIG. 4. The shown lightweight building panel (100) comprises two cover plates (101, 111) and an intermediate support core (121). Each cover plate (101, 111) consists in the shown embodiment of a thin particle board. The support core (121) is for example a PU foam core. The cover plates (101, 113) are glued with their inner surfaces (103, 113) to the plate-shaped support core (121).

The lightweight building panel has a wall thickness of 37.5 mm. Each cover plate has a thickness of four millimeter in the shown example. Instead of a foam core, it may also have a honeycomb core.

The lightweight building panel may also be curved that is it may have a cylindrical or spherical shape as long as the material thickness of the support core (121) is at least approximately constant.

In accordance with FIG. 4, the expansion body (10) is essentially pot-shaped, that is, it is a tubular body with a bottom (52). The expansion body (10) is divided into three areas; an engagement section, a locking section (40) and a foot section (50).

Figure 2:
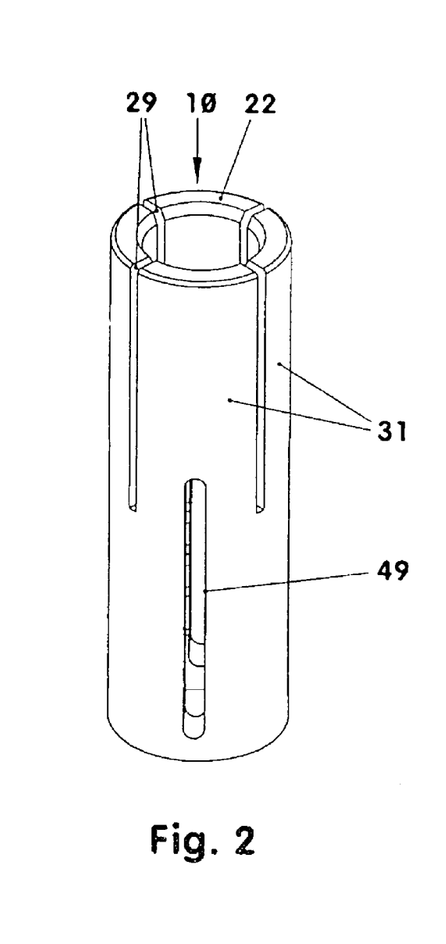
FIG. 2: The unexpanded expansion body of the anchor of FIG. 1.

As shown in FIGS. 2 and 4, the upper area of the expansion section (10) which is for example, cylindrical, has for example four straight longitudinal slots (29). The slots (29) however may also be spirally curved. They separate four locking elements (31) from one another. The length of the longitudinal slots (29) is for example 40 to 60% of the length of the expansion body. Their width is in the exemplary embodiment 0.5 mm and is constant over the full length of the anchor as long as it is not deformed, the longitudinal slots (29) may end in radially extending stress-relieving bores.

Figure 8:
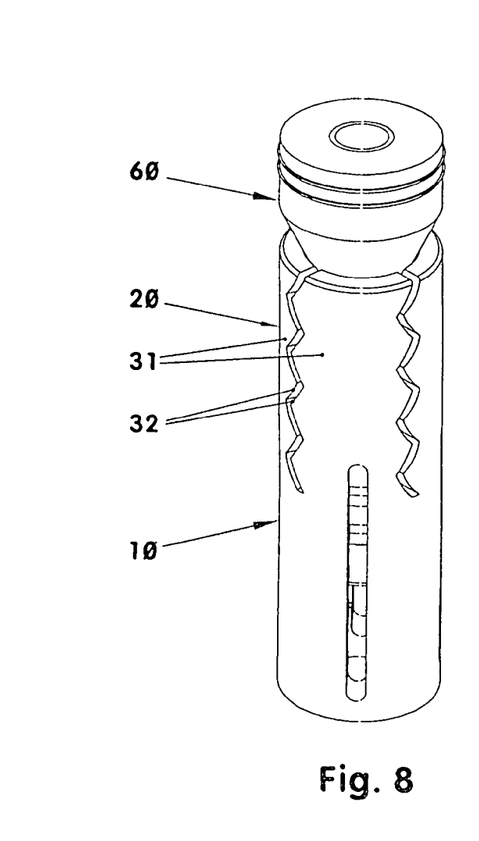
FIG. 8: An anchor as shown in FIG. 1, but with different longitudinal slots and partially inserted wedge body.

FIG. 8 shows an expansion body (10) which is provided for example with a zigzag, meander shaped or merlon-like longitudinal slot (29). Upon unintended rotation of the installed anchor in the area of the support core (121) by threading in of a screw, not shown, into the anchor, part of the locking flank sections (32) of the adjacent locking elements (31) come into contact with one another.

In the area of the locking elements (31), the inner wall (21) of the expansion body (10) has a cylindrical form.

The expansion body (10) has at the upper end of the locking element (31), a front face area (22) which in the present case is flat. Expediently, it may also have the shape of a flat truncated cone sleeve whose fictive tip is disposed on the center line (9) of the anchor above or below the upper expansion body end. In such a case, as cone angle, an angle of for example 156 angular degrees may be provided.

Since the expansion body (10) has a length which is equal to, or slightly smaller than, the shortest distance between the cover plates (101, 111), the front face (22) is disposed, within the usual tolerances, in the plane of the inner surface (103) of the upper cover plate (101). According to FIG. 4, the outer edge (23) of the front face area (22) is disposed opposite the inner edge (106) of the bore (105). At its inner and outer edge the front face (22) is chamfered or rounded, see FIG. 2.

Below the locking elements (31), there is a locking zone (40) which consists for example of three engagement projections (41) and three engagement recesses (42) which are arranged alternately one behind the other. The individual annular support projection (41) which has several interruptions has a sawtooth like cross-sectional shape. The engagement projection distance is about one fourth of the expansion body diameter.

Each individual support projection (41) is provided with a slide flank (44) and a support flank (43). The support flank (43) which, in accordance with the FIGS. 4 to 7, is disposed always below the slide flank (44) of the same support projection (41) is part of a plane which extends normal to the center line (9). The slide flank (44) has the form of a truncated cone sleeve. The cone angle of the sleeve is for example 60 angular degrees, wherein the imaginary tip, which is disposed on the centerline (9), is always below the support flank (4) of the respective support projection (41).

The bottom (45) of the engagement grooves (42) has a diameter which corresponds to the diameter of the cylindrical inner wall (21) of the engagement section (20).

In the area of the locking zone (40), there are in this case four relief slots (49) which extend parallel to the anchor center line (9). They are arranged opposite the longitudinal slots (29) displaced by 45 angular degrees. The relief slots (49) which are rounded at their ends may extend upwardly and downwardly 0.1 to 3 mm beyond the locking zone. The width of the relief slots (49) is twice the width of the longitudinal slots (29). In the shown embodiment, this is one millimeter.

Adjacent the locking zone (40) toward the bottom, there is the cylindrical bottom section (50). Its outer contour which extends around a dead end bore (51) ends with the lower end area (52). The dead end bore (51) has a diameter which corresponds to the minimum diameter of the support projection (41).

The expansion body (10) is disposed with the bottom face of its lower end area (52) directly on the inner surface (113) of the second, or respectively lower, cover plate (111). For this purpose, the bottom end area (52) may also be concavely curved or it may have a structure such that it contacts the inner surface (113) only by line contact, point contact or partial contact.

Figure 6:
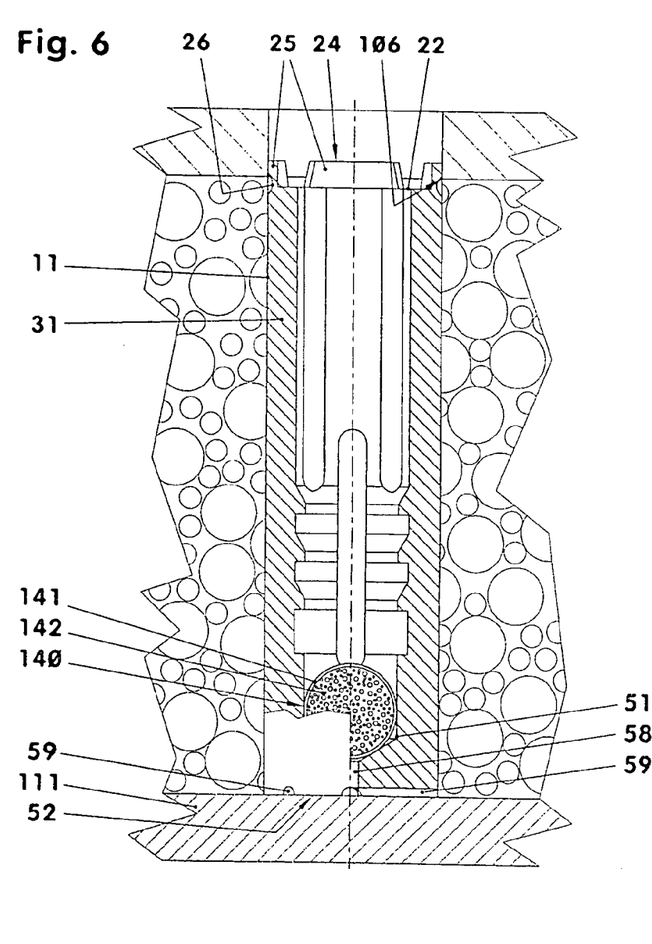
FIG. 6: An expansion body with displacement preventing means.
Figure 7:
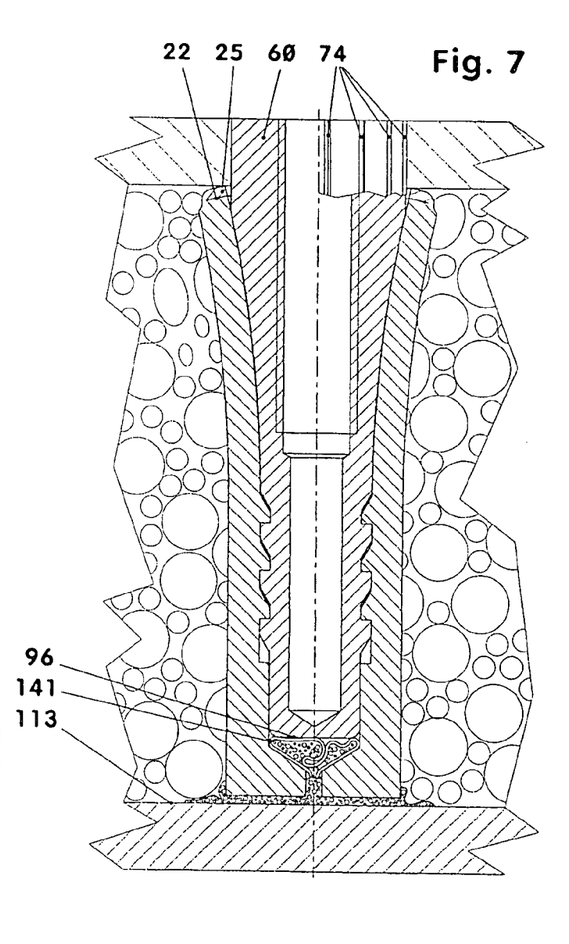
FIG. 7: An anchor mounted with an expansion body of FIG. 6.

Of course, the lower end (52) may also be omitted if the detail solution according to FIGS. 6 and 7 is not used.

Figure 3:
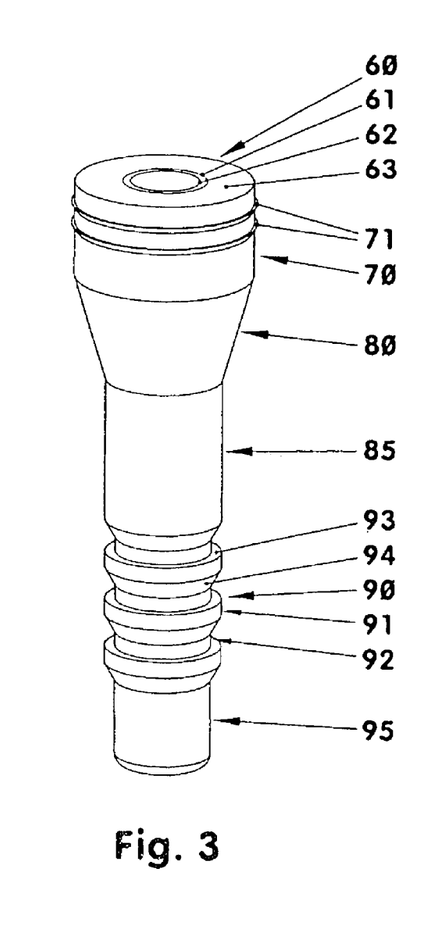
FIG. 3: The expansion body of FIG. 1.
Figure 5:
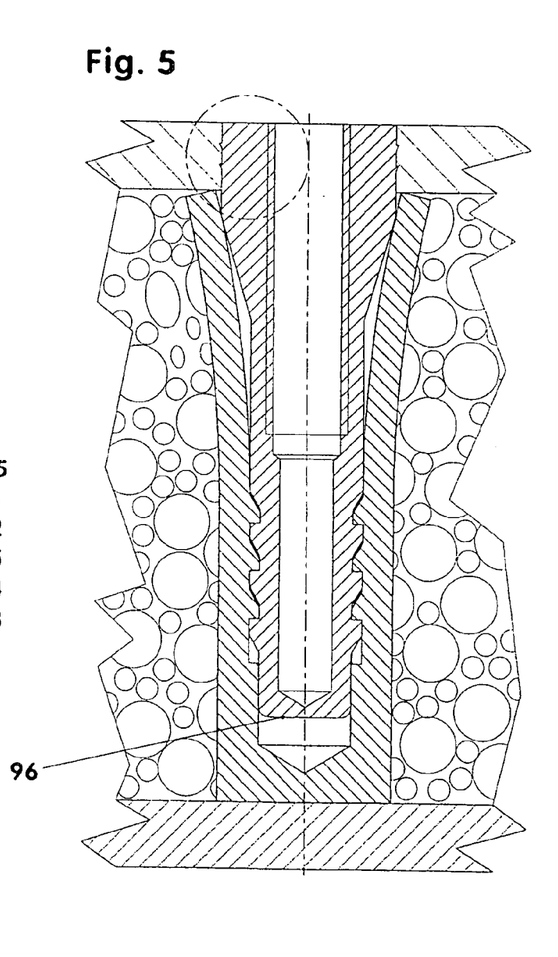
FIG. 5: An anchor mounted with the expansion body of FIG. 4.

FIG. 3 shows a wedge body (60) as shown in FIGS. 5 and 7. The wedge bodies (60) are, at least in areas, rotationally symmetrical components. They have in this case four sections: a seating section (70) which forms a cylindrical area, an expansion section (80) in the form of a wedging zone, if expedient an intermediate section (85), a locking zone (90) and a bottom end zone (90).

The wedge body (60) includes a central bore (61) with a metric internal thread (62). Alternatively, the bore (61) may have a square, oval, polygonal or star-like cross-section for accommodating non-metric screws, for example, particle board screws or wood screws. The bore cross-section may also become smaller from the beginning of the bore toward the end of the bore.

The seating section (70) of the wedge body (60) has an essentially cylindrical outer contour, see FIG. 3. This section (70) is disposed in connection with an anchor installed in a lightweight building panel (100) in the bore (105) of the upper cover plate (101) possibly with a press-fit. According to FIGS. 5 and 7 one fourth to one third of the length of the seating section (70) extends additionally into the area of the support core (121). The purely cylindrical part of the seating section (70), the cylinder zone, has here an outer diameter which corresponds to the inner diameter of the bore (105). In FIG. 3, the seating section (70) has two circumferential retaining hook webs (71). The closed, annular retaining webs (71) have each a triangular cross-section, see FIGS. 5 and 9 with a support flank (72) and a slide flank (73). They project for example 0.15 mm over the respective cylindrical outer contour. The cause, among others, is a clamping of the wedge body (60) in the bore (105) which prevents rotation of the wedge body (60) in the bore (105). Additionally, the retaining hook webs seal the installation gap between the wedge body (60) and the light-weight construction panel (100), so that neither dirt nor moisture can enter. Also, in this way, no support core material can reach the ambient.

Alternatively, the seating section (70) may include a plurality of longitudinal webs (74), see FIG. 7. In the present case, it has 15 longitudinal webs (74). All webs extend parallel to the centerline (9) of the anchor. Also, in this case, each web (74) has a triangular cross-section, wherein its flanks enclose for example an angle of 90° degree. Expediently, the cross-sections of the webs (74) increase from top to bottom. This increases the tightness of the mounting gap.

The seating section (70) is followed by the wedging zone. The latter comprises a truncated cone whose fictive tip is arranged in the intermediate section (85) or the locking part (90) on the centerline (9). The acute angle is between 30 and 45 angular degrees. In the embodiment shown, it is 33.4°. The minimum outer diameter of the wedging zone (80) corresponds to the inner diameter of the undeformed engagement section (20) of the expansion body (10).

In the embodiment shown, the wedging zone (80) is followed by a cylindrical intermediate section (85) and the locking part (90). At least the end of the intermediate section (85) adjacent the locking part (90) has the same outer diameter as the inner diameter of the undeformed engagement section (20). Independently of the representations of FIGS. 1 to 10, the wedging zone (80) and the intermediate section (85) can be combined to a rotationally symmetrical wedging section wherein the cross-sections of this new wedging section increases continuously from the locking zone (90) to the cylinder zone (70) and, at least in some areas, in a non-linear manner, see FIG. 7. There, the locking elements (31) are engaged. by the wedging body (60) at least over some part thereof.

The locking part (90) of the wedging body (60) is of a design comparable to the locking zone (40) of the expansion body (10). From the top to the bottom, there are provided successively, three engagement projections (91) of an engagement groove (92), see FIG. 3. The pitch and the profile shape are known from the locking zone (40) described above. Also, in this case, the engagement projections (91) have each a support flank (93). However, in this case, it is arranged on each engagement projection (91) above the respective slide flank (94).

In accordance with the embodiments as shown the locking occurs exclusively in the separate locking zone (40) with the locking part (90). But it is also possible to arrange the locking zone partially or completely for example in the wedge zone (80), for example, in the area of the locking elements (31).

The locking part (90) is followed by a cylindrical bottom end zone (95). It ends with a bottom end wall (96) in FIG. 5. The outer diameter of the bottom end zone (95) corresponds to the minimal groove base diameter of the locking grooves (92).

The expansion body (10) and the wedge body (60) consist for example of polyimide.

In order to facilitate installation of the anchor, a bore is drilled through the upper cover plate (101) and into the support core (121). As drilling tool for example a spiral drill is used, which has a tip angle of 180 angular degrees. It is also possible to use a counter bore drilling tool. The drilling tool removes the support core (121) material over the full length. The second cover plate (111) is generally not affected by the drilling. However, any support core material and any cement are essentially removed from the base of the opening.

The opening or, respectively, bore (130), which comprises the bores or respectively bore sections (105) and (125) is for example blown out by compressed air or is evacuated.

The expansion body (10) is inserted into the empty bore (130) over the full length so that it abuts the inner surface (113) of the second cover plate (111) and its front end face (22) is disposed on the plane of the inner surface (103) of the first cover plate (101). The expansion body (10) is disposed for example in foamed support cores in the bore (125) only with little play.

Upon installation of the wedge body (60) into the bore (21, 51) of the expansion body (10) the wedging zone (80) of the wedge body (60) presses locking elements (31) of the expansion body (10) elastically apart, so that they extend behind the inner surface (103) of the first, upper cover plate (101). The front face area (22) may be so designed, that it the surface thereof abuts, with the whole face area thereof, the inner surface (103) of the cover plate (101). At the same time, the cylinder zone or, seating section (70) of the wedge body (60) is pressed into the bore section (105). The cylinder zone (70) is disposed in the bore section (105) with a residual radial engagement bore and, at its end, is disposed planar with the outer surface (102) of the first cover plate (101). The upper planar front end face (63) of the wedge body (60) is disposed one to three tenths of a millimeter below the outer surface (102) of the cover plate (101).

At the end of the expansion movement of the locking elements (3), the engagement projections (91) of the wedge body (60) engage into the locking grooves (42) of the expansion body (10) in an unreleasable manner. During the three locking steps occurring in the process, the expansion body (10) is expanded three times for a short time. The release slots (49) are temporarily elastically widened in the process. After completion of the locking process, the expansion body (10) assumes in area of the locking zone again its cylindrical contour (11). A fixture, for example, to be mounted can now be attached by a screw screwed into the bore (61) of the wedge body (60).

The thread (62) of the bore (61) ends in the shown embodiments shortly ahead of the locking zone (90).

In the shown embodiments, the wedge body is, at least as far as its outer contour is concerned, at least to a large extent, a rotational symmetrical body. Alternatively, however, its various cross-sections or at least part thereof may have square, polygonal oval or otherwise profiled cross-sections. The wedge body (60) together with the expansion body (10) may be interconnected in the locking zone for example by a thread so that the wedge body is not installed in a linear, non-rotating movement, but by a screw-in movement.

The FIGS. 6 and 7 show two additional detail solution. The first detail solution concerns a problem which may occur with the installation of the anchor into a honeycomb plate. In that case, after the drilling of the bore (130), the expansion body (10) may be laterally displaced after insertion into the support area before the wedge body (60) is pressed into the expansion body (10) and hold it in a centered position.

In order to prevent a lateral displacement, the upper front face area of the wedge body (10) has a different shape. The front face area (22) is provided with thin-walled upstanding rim (24) forming edge segments (25), which extends the outer contour (11) of the expansion body (10) to such an extent that the outer edge (23) of the rim (24) is disposed above the inner surface (103) of the cover plate (101) as shown in FIG. 6. Each locking element (31) carries at least one edge segment (25). The edge segments (25) are provided with inclined side areas.

In the transition area between the locking elements (31) and the edge segments (25), the outer contour (11) is provided with a circumferential groove (26) interrupted by the longitudinal slots (29) for the formation of film joints.

As shown in FIG. 6, the center of the groove (26) is disposed vertically slightly below the plane of the inner surface (103) of the cover plate (101). When now the wedge body (60) is driven into the expansion body (10), the locking elements (31) are pressed outwardly whereby the edge segments (25) are bent inwardly by the bore edge (106) and folded onto the front face (22), see FIG. 7. Together with the folded edge segments (25), the expansion body (10) has then a length needed to fit between the cover plates (101, 111).

The sideward displacement of the expansion body (10) in the lightweight construction plate (100) may also be prevented by support webs (27). The support webs (27) alternate in the engagement section (20) of the expansion body (10) with the locking elements (31), see FIGS. 10 and 11. The support webs (27) are longer than the locking elements (31), so that they end in the bore (105) of the cover plates (101) above the inner surface (103). They have additionally a greater wall thickness than the locking elements (31). Accordingly, the wedge body (60) needs to have support web grooves (76), in which the support webs (27) are accommodated. The support web grooves (76) extend into the cylinder zone (70) and end there below the upper front face (63). The grooves (76) may end shortly below the barbed webs (71).

Figures 9, 10, 11:
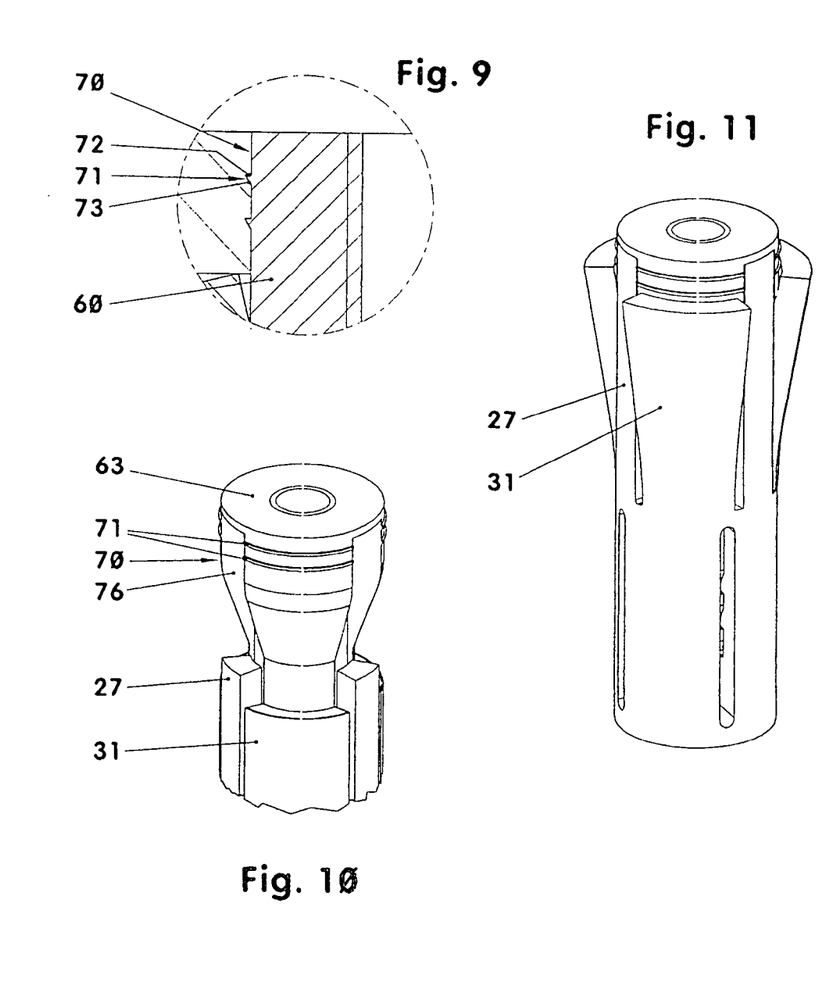
FIG. 9: Enlargement of a detail of FIG. 5.
FIG. 10: Partial view of the combination of the wedge body and the expansion body with support webs.
FIG. 11: Like FIG. 10, but with the wedge body inserted.

FIG. 11 shows the anchor with the wedge body (60) fully inserted. The support webs (27) essentially fill the support web grooves (76). The locking elements (31) are spread apart.

The second detail solution makes an additional fixing of the anchor to the lower cover plate by cementing possible. To this end, a cement material cartridge or respectively, balloon (140) is disposed in the expansion body (10). In the lower end of the dead-end bore (51) for example a ball- or barrel-shaped cement material balloon (140) is disposed. The latter consists of a thin-walled membrane (141) which durably encloses a cement material (142) in a manner that it will not dry out. The membrane (141) may even include two chambers so that it can separately store two different cement material components.

As shown in FIGS. 6 and 7, the bottom (52) includes for example eight radial grooves (59) which extend in the center of the bottom from an axial bore (58) outwardly to the outer wall (11) of the expansion body (10). When now the wedge body (60) is pressed into the expansion body (10), see FIG. 7, the cement material balloon (140) is compressed between the bottom walls (96) and (52) such that it fractures. For a desired support of the fracturing effect, the cement balloon (140) may have a weak part designed to fracture when desired. It is also possible to arrange a puncture or ripping device at one of the bottom walls (52, 96). A combination of weak area and fracturing device is also possible.

The cement material (142) discharged from the cement material balloon is pressed by the advancement of wedge body (60) acting as a piston through the bore (58) into the grooves (59). From there the cement material (142) is distributed between the bottom (52) and the inner surface (113) of the lower cover plate (111). The excess cement (142) envelops additionally the lower area of the outer contour (11) of the expansion body (10). By the cementing of the expansion body (10) or, respectively, the anchor to the lower cover plate (111) the latter assumes part of the load effective on the anchor.

Figure 12:
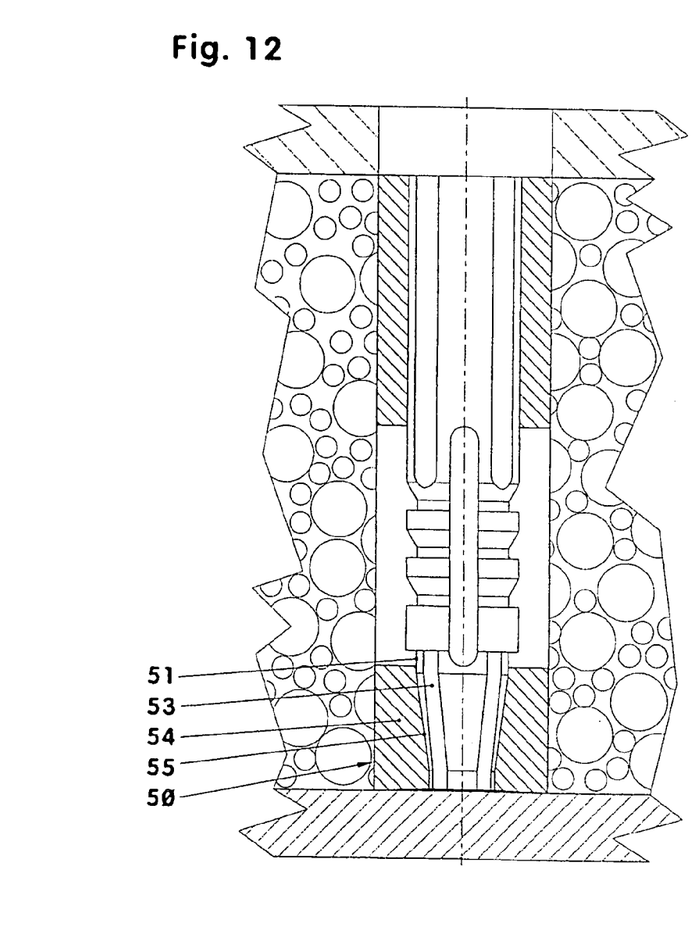
FIG. 12: Like FIG. 4, but including a second expansion structure.
Figure 13:
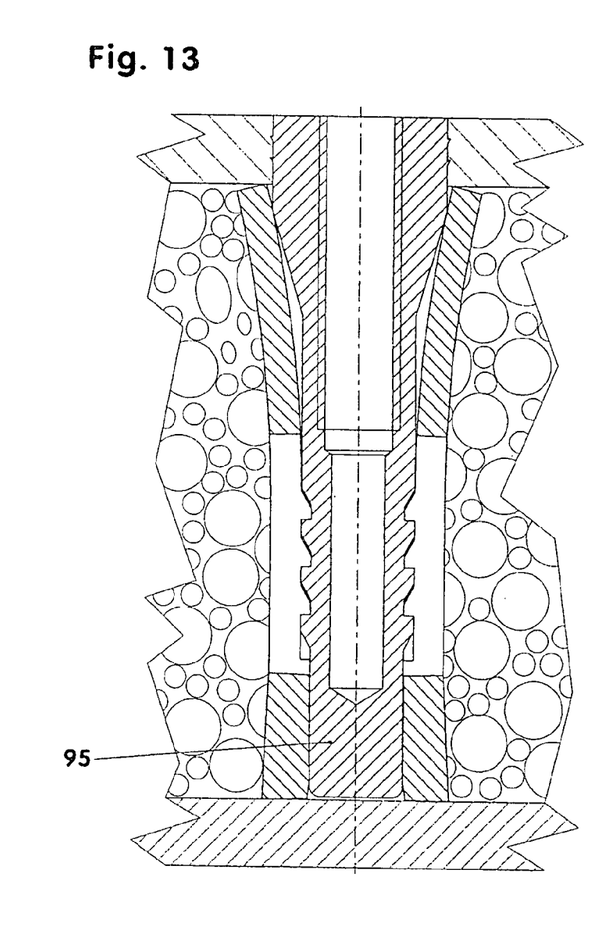
FIG. 13: Anchor of FIG. 12 with the expansion body installed.

FIGS. 12 and 13 show an embodiment with a second expansion structure. To this end, the foot section (50) is provided with for example four longitudinal slots (53). The longitudinal slots (53) are arranged at an angular spacing of 90° and are disposed for example aligned with the slots (29). They separate four additional spreading elements (54). The latter are tightly clamped in the lower part of the support core layer when the anchor is set. This further increases the retaining force of the anchor. The foot section (50) has herefore a cylindrical bore (51) which has a lower end with a truncated cone-shaped inner contour (55). Upon insertion of the wedge body (60), the foot section (95) then displaces the spreading elements (54) outwardly see FIG. 13.

Figure 14:
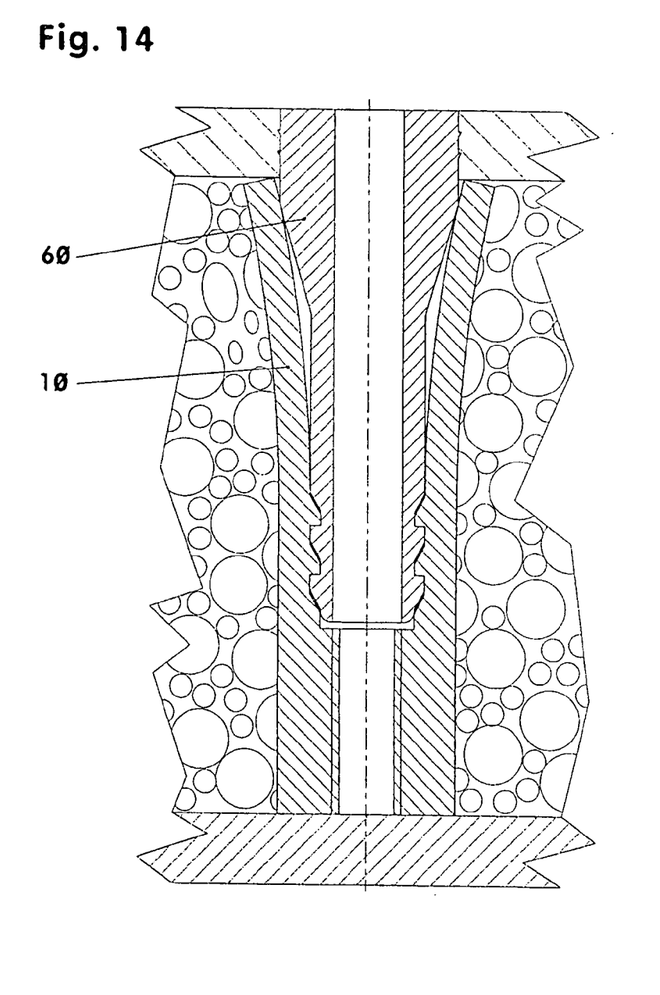
FIG. 14: Anchor with another screw-in possibility.
Figure 15:
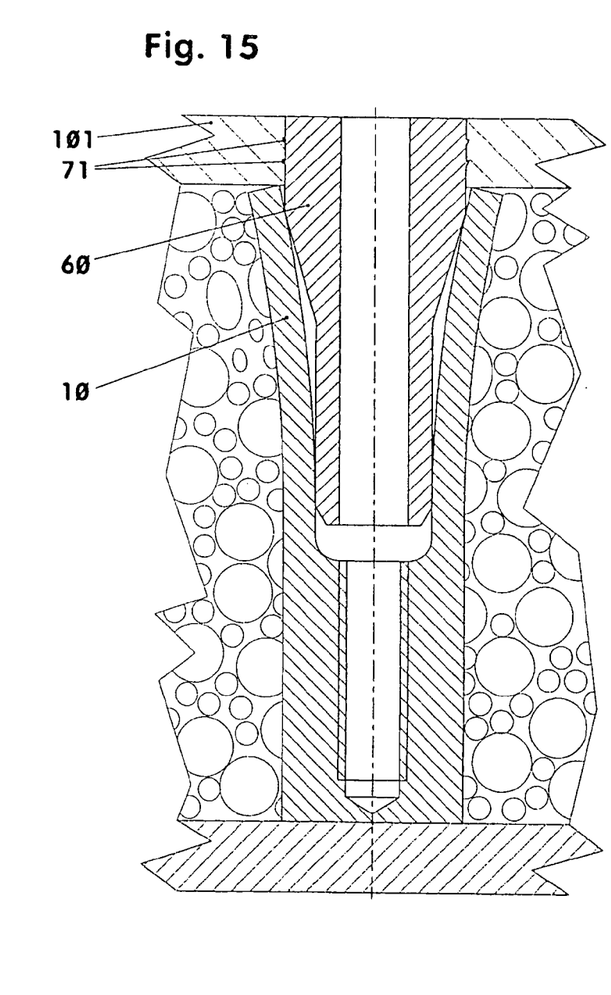
FIG. 15: Anchor without locking structure.

FIGS. 14 and 15 show two different anchors wherein the mounting means is inserted not into the wedge body (60) but into the expansion body (10). In accordance with FIG. 14, the wedge body is unreleasably locked in the expansion body.

In the anchor according to FIG. 15, no interlocking structure is provided. The wedge body (60) is retained by barbed webs (71), see also FIG. 9, arranged in the cover plate (101).

Figure 16:
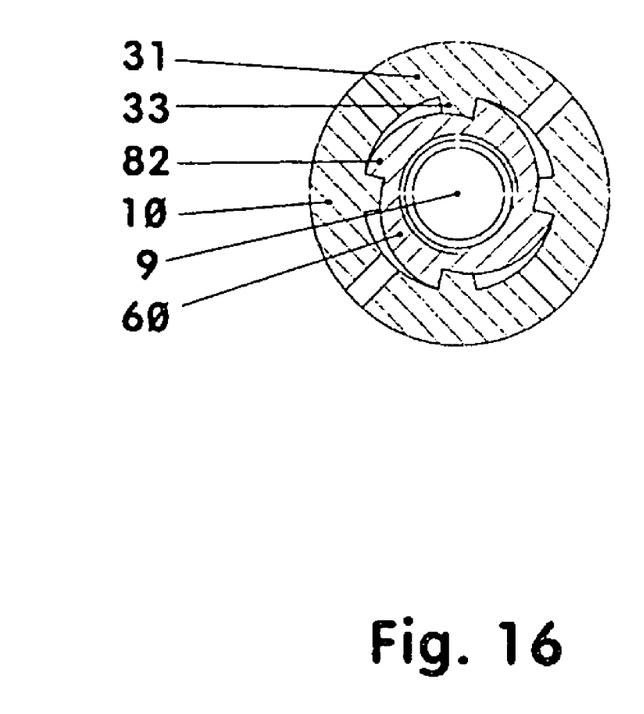
FIG. 16: Cross-sectional view of a not-yet-deformed anchor with excentric spreading.
Figure 17:
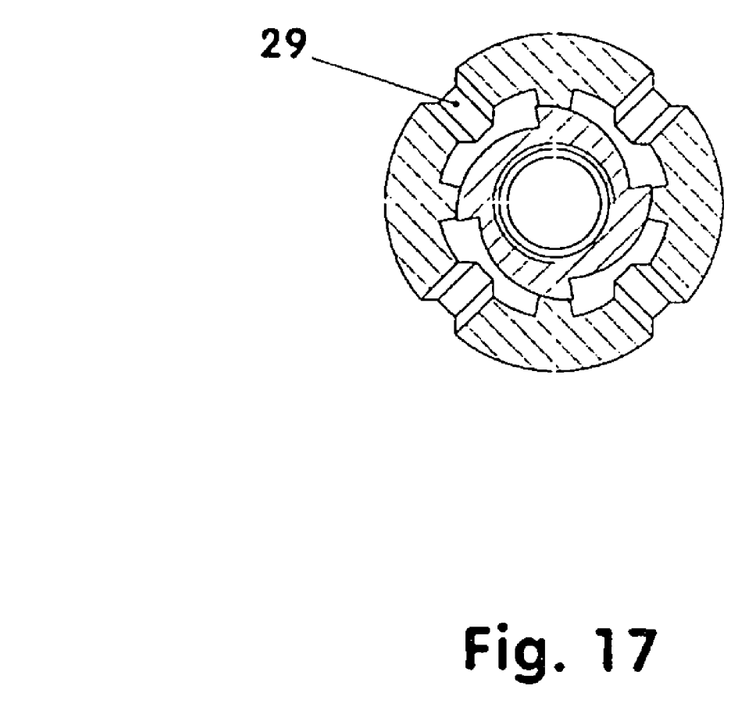
FIG. 17: Cross-sectional view of a deformed anchor with excentric spreading.

FIGS. 16 and 17 show cross-sections of an anchor, wherein the wedge body (60) is arranged in the expansion body (10) already before the installation of the anchor. The anchor is consequently inserted into the bore (130) in a preassembled state, see FIG. 4. The wedging zone of the wedge body (60) is in this case for example four excenter elements (82) which cause spreading of the elements (54) of the expansion body (10) by rotation about the longitudinal axis (9) of the anchor. The excenter elements (82) slide in the process along the cams 33 which are formed onto the engagement elements (31).

The rotational movement of the wedge body (60) in the expansion body (10) may be limited or locked for example by locking elements or stops. In FIGS. 16 and 17, the locking and/or stop elements are shown in another sectional plane.

Of course, the principle of the anchor is not limited to anchors with at least partial cylindrical contour. The anchor may also be designed for example for a cavity which has an, at least in sections, elongated or oval cross-section.

LISTING OF REFERENCE NUMERALS

9 Center line of the anchor
10 Expansion body
11 Outer wall, cylindrical contour
20 Engagement section
21 Inner wall, bore
22 Front face area
23 Outer edge
24 Rim
25 Edge segment
26 Groove
27 Support webs 29 Longitudinal slot
31 Engagement elements, spreading elements
32 Engagement flank sections
33 Cams
40 Locking zone
41 Support projection
42 Engagement recesses, support grooves
43 Support flanks
44 Slide flanks
45 Groove bottom
49 Relief slots
50 Foot section
51 Dead end bores, chamber
52 Low end, bottom
53 Longitudinal slots
54 Spreading elements
55 Bore, cone-shaped
58 Axial bore, cavity
59 Radial grooves
60 Wedge body
61 Central bore
62 Internal thread
63 Front face, top
70 Seating section, cylinder zone
71 Barbed webs, circumferential webs, surface structure
72 Support flank
73 Slide flank
74 Longitudinal webs, surface structure
76 Support web grooves
80 Spreading section, wedging zone
82 Eccentric elements
85 Intermediate section
90 Locking part
91 Engagement projection
92 Engagement recesses, engagement grooves
93 Support flank, planar
94 Slide flank
95 Bottom end section, piston like end
96 Bottom
100 Sandwich panel lightweight composite panel, areal construction component with support core
101 Upper cover plate
102 Outer surface
103 Inner surface
105 Bore
106 Inner edge
111 Lower cover plate
113 Inner surface
121 Support core, honeycomb core, foamed material core
125 Bore
130 Overall bore, cavity
140 Cement material cartridge, cement material balloon
141 Membrane
142 Cement material

The invention claimed is:

1. An anchor for mounting on building panels (100) which are manufactured with a support core having first (101) and second cover plates (111) and at least one intermediate support core layer (121), said anchor including at least one expansion body (10) and at least one wedge body (60) and the wedge body (60) being at least partially inserted into the expansion body (10) and including an opening for the screwing in or pounding in of a mounting means, wherein
the installed anchor is disposed in an opening (130) of the building panel (100) which extends through a bore (105) in the first cover plate (101) and the intermediate support core layer (121),
the expansion body (10) includes at least two spreadable locking elements (31, 54) and at least one locking zone (40),
the wedge body (60) has at least one cylindrical seating zone (70), at least one wedging zone (80) and at least one locking zone (90),
with the wedge body in place, the at least one cylindrical seating zone (70) abuts in the bore (105) the first cover plate (101), a wedging zone (80) spreads apart the locking elements (31) of the expansion body (10) behind the first cover plate (101) which abut the cover plate (101) so that the locking zones (40, 90) are locked together, and the end of the expansion body (10) abuts the second cover plate (111).

2. The anchor according to claim 1, wherein the expansion body (10) has a tubular shape.

3. The anchor according to claim 1, wherein the expansion body (10) is provided, at least in some areas, with longitudinal slots for forming the locking elements (31).

4. The anchor according to claim 1, wherein the wedging zone (80) of the wedge body (60) has a circular, a square, a polygonal or star-shaped cross-section.

5. The anchor according to claim 1, wherein with the anchor installed, a cylinder zone (70) of the wedge body (60) abuts the first cover plate (101) at least in some areas without play.

6. The anchor according to claim 1, wherein, with the anchor installed, the cylinder zone (70) of the wedge body (60) disposed in the bore (105) is provided with a structured surface (71, 74) to prevent rotation of the anchor.

7. The anchor according to claim 1, wherein the locking zones (40, 90) of the expansion body (10) and the wedge body (60) each are provided with a saw tooth profile.

8. An anchor for the attachment on building panels (100) manufactured in a support core design, comprising first and second cover plates (101, 111) and at least one intermediate support core layer (121), the anchor comprising at least one wedge body (60) at least partially inserted into an expansion body (10) and including an opening for screwing in or pounding in a mounting means, the installed anchor being disposed in an opening (130) of the building panel (100) which extends through the first cover plate (101) and the intermediate support core layer (121),
wherein
the expansion body (10) has at least two spreadable engagement elements (31), at least one locking zone (40) and a chamber (51) having a cement cartridge (140) containing at least one cement (142) disposed therein and having at a bottom-end thereof a discharge opening (58),
the wedge body (60) includes at least one cylinder zone (70), at least one wedging zone (90) and a piston-like end (95),
with the anchor installed, a cylinder zone (70) of the wedge body (60) abuts the wall of a bore (105) in the first cover plate (101), a wedging zone (80) spreads the engagement elements (31) of the expansion body (10) apart behind the first cover plate (101) so as to abut the first cover plate, the locking zone (40) and the locking part (90) are interlocked, the bottom end (52) of the expansion body (10) abuts the second cover plate (111) and the cement (142) of the opened cement cartridge (140) is distributed in a mounting structure gap between the lower cover plate (111) and the bottom end (52) of the expansion body (10).

9. The anchor according to claim 8, wherein the bottom end (52) of the expansion body (10) includes grooves (59) for the distribution of the cement (142).

10. An anchor for the attachment on flat building components (100) comprising first and second cover plates (101, 111) and at least one intermediate support core layer (121), the anchor including at least one expansion body (10) and at least one wedge body (60) which is at least partially inserted into the expansion body (10) and includes an opening for the screwing in, or, pounding in, of a mounting means, wherein     the installed anchor is disposed in a cavity (130) of the building component (100) which extends through a bore (105) in the first cover plate (101) and the intermediate support core layer (121),     the expansion body (10) has at least two spreadable engagement elements (31),     the wedge body (60) has at least a cylinder zone (70) and at least a wedging zone (80),     with the anchor installed, a cylinder zone (70) abuts the wall of the bore (105) of the first cover plate (101), a wedge zone (80) spreads apart the engagement elements (31) of the expansion body (10) behind the first cover plate (101) so as to abut the backside of the first cover plate (101) and the end of the expansion body (10) abuts the second cover plate (111).

\* \* \* \* \*